US006612762B1

(12) United States Patent
Sakurai et al.

(10) Patent No.: US 6,612,762 B1
(45) Date of Patent: Sep. 2, 2003

(54) PRINTER

(75) Inventors: Motoharu Sakurai, Chiba (JP); Satoru Tada, Noda (JP); Naoki Tanabe, Saitama-ken (JP); Mikio Amakasu, Chiba (JP)

(73) Assignee: Seiko Precision Inc., Chiba-Ken (JP)

( * ) Notice: Subject to any disclaimer, the term of this patent is extended or adjusted under 35 U.S.C. 154(b) by 0 days.

(21) Appl. No.: 09/584,007

(22) Filed: May 30, 2000

(30) Foreign Application Priority Data

May 31, 1999 (JP) .......................................... 11-152608

(51) Int. Cl.[7] .......................... B41F 17/00; B41J 13/12; B41J 23/00; G11B 25/00

(52) U.S. Cl. ...................... 400/542; 400/144.2; 347/37; 347/38; 347/104; 347/26; 101/35; 101/41; 101/42; 101/43; 369/289

(58) Field of Search .......................... 101/35, 4, 41–43; 400/542, 144.2, 120.16, 48; 369/289; 364/478, 104, 215, 38, 37

(56) References Cited

U.S. PATENT DOCUMENTS 4,475,827 A * 10/1984 Willemse et al. ........ 400/144.2
5,448,950 A * 9/1995 Lowder et al. ............. 101/333
5,609,102 A * 3/1997 Rapp ....................... 101/127.1
5,697,496 A * 12/1997 Bauer ...................... 206/308.1
6,123,020 A * 9/2000 Wolfer et al. ................. 101/35
6,148,722 A * 11/2000 Hagstrom .................... 101/35
6,312,174 B1 * 11/2001 Drynkin et al. ........ 400/120.16
6,363,987 B1 * 4/2002 Koch ......................... 156/391

* cited by examiner

*Primary Examiner*—Andrew H. Hirshfeld
*Assistant Examiner*—Marvin P. Crenshaw
(74) *Attorney, Agent, or Firm*—Joel E. Lutzker, Esq.; Anna Vishev, Esq.; Schulte Roth & Zabel LLP

(57) ABSTRACT

The present invention is intended to provide an economical printer which is simple in structure and uses a common tray but is capable of adapting itself to various recording media of different shapes. Adapters in which recording media can be firmly held can be selectively mounted in the tray. An adapter 24 has an oval opening **24*a* in which a recording medium 30 can be placed. The contour of the adapter 24 can fit into a recessed portion 23*a* formed in the tray 23. The recording medium 30 is firmly held in the adapter 24. When the adapter 24 is mounted in the recessed portion 23*a* in the tray 23, a keyway 23*b* and a protrusion 24*b* engaging the keyway 23*b* prevent the adapter 24 from shifting out of position; the adapter is held in the tray 23. Prints can be made in accurate positions on the recording medium 30**.

15 Claims, 8 Drawing Sheets

PRINTER

BACKGROUND OF THE INVENTION

1. Field of the Invention

The present invention relates to a printer and, more particularly, to a printer having a printing section into which thick-walled recording media of various shapes (e.g. circular and rectangular shapes) such as compact disks (CDs) and smart cards are guided to print desired characters and symbols on the surfaces of the media; the media are then discharged to a discharge portion.

2. Description of the Prior Art

In recent years, a tray 7 as shown in FIG. 8 has been used where prints are made on the surface of a recording medium such as a circular CD 8 having a diameter of 120 mm. This tray 7 is provided with a circular recessed portion 9 having a diameter of 120 mm, and the CD 8 fits into this recessed portion 9. Printing is to be done on the surface of the CD 8. The CD 8 is placed into the recessed portion 9 and then the tray 7 is inserted into a tray guide installed in the supply path in the printer. The tray 7 is then sent into the printing section, where printing is accomplished.

SUMMARY OF THE INVENTION

With the prior art tray as shown in FIG. 8, a slight difference is normally found between the contour of the CD 8 and the inside diameter of the recessed portion 9 because of variable manufacturing tolerances. Therefore, position deviation occurs during printing, making it difficult to print accurately in desired positions. In the case of a non-circular recording medium such as a rectangular card, the aforementioned tray cannot adapt itself to the medium. Consequently, a separate tray having a recessed portion adapted for this contour must be prepared.

To solve the foregoing problems, the present invention provides a printer having a supply path for supplying a recording media, a printing section for printing on the recording media, and a discharge portion for discharging each recording medium once printing is complete. The printer is characterized in that each recording medium is supplied to the printing section through the supply path while the recording medium is held to a tray. Additionally, an adapter in which the recording medium can be firmly held may be removably installed in the tray. Therefore, the common tray can be used for various adapters. The tray, and thus the printer, can cope with recording media of various shapes simply by exchanging the adapter.

A printer in accordance with the present invention comprises at least one supply path for supplying recording media, a printing section for making prints on each recording medium, and a discharge portion for discharging each recording medium on which prints have been made by the printing section. Each recording medium is held on a tray when supplied to the printing section from the supply path. An adapter in which the recording medium is firmly held can be removably installed in the tray.

Preferably, the above-described adapter has an opening in which a recording medium can be inserted. The adapter itself may be inserted in a recessed portion formed in the tray. An engaging keyway is formed in one of the adapter or tray, while the other is provided with a protrusion engaging the engaging keyway to place the adapter in position circumferentially in the recessed portion of the tray.

Preferably, holes are formed on opposite sides of the opening in which the recording medium can be placed. The adapter is resiliently deformed so as to shrink the holes, whereby the recording medium is resiliently held by the adapter. The adapter is resiliently held by the tray.

Preferably, the aforementioned adapter is provided with a stop portion to prevent the recording medium from escaping toward its face. The tray is provided with a stop portion for inhibiting escape of the adapter toward a face of the recording medium.

BRIEF DESCRIPTION OF THE DRAWINGS

FIG. 3(*b*) is an enlarged cross section of one spring portion of the tray guide;

FIG. 3(*c*) is an enlarged cross section of one spring portion of the tray guide, showing the manner in which a tray is to be supplied;

FIG. 7(*b*) is a cross-sectional view taken on line B—B of FIG. 7(*a*);

Detailed Description of the Invention

One example of the present invention is hereinafter described with reference to the drawings.

Figure 1:
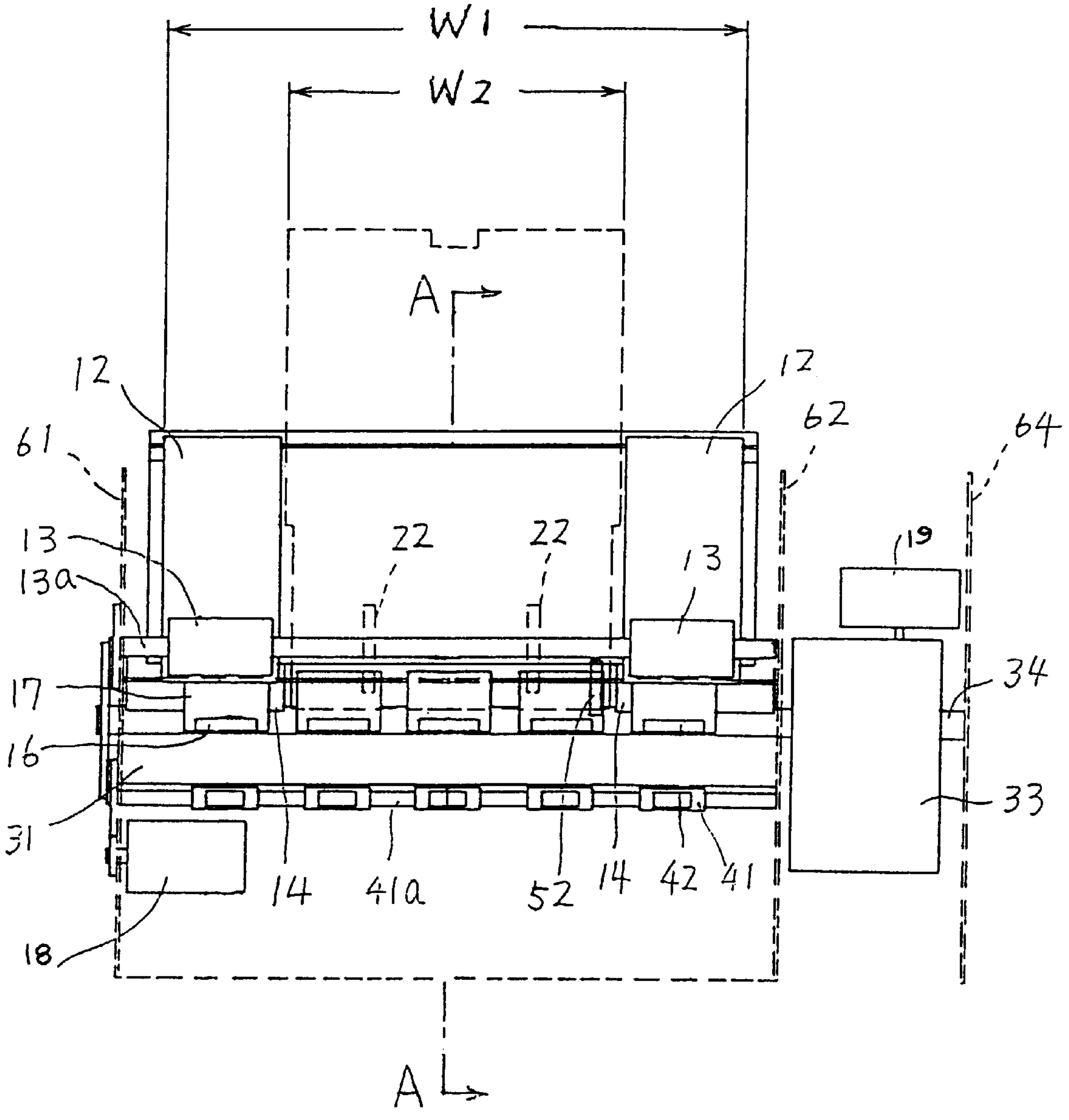
FIG. 1 is a schematic plan view of the whole construction of one example of the present invention, and in which a cut sheet feeder has been removed.
Figure 2:
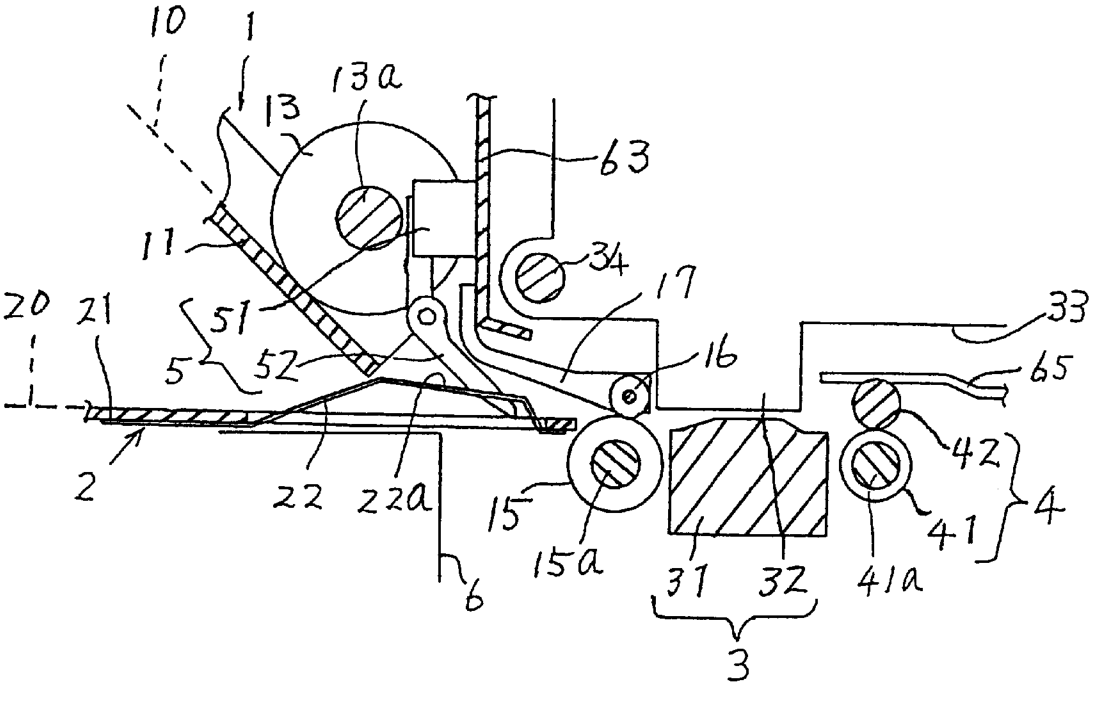
FIG. 2 is an enlarged cross section taken on line A—A of FIG. 1.

FIGS. 1 and 2 schematically show the whole construction of a printer in accordance with the present invention. The printer has a first supply path 1 for supplying a recording medium 10 and a second supply path 2 for supplying a recording medium 20. The recording media 10 and 20 are supplied to a common printing section 3 via their respective supply paths. After prints are made in the printing section 3, the media are discharged to a common discharge portion 4.

The first supply path 1 can supply a thin recording medium 10, such as paper, to the printing section 3. The width WI of the path is set large. The recording medium 10 is placed on a cut sheet feeder (CSF) 11. A pair of CSF guides 12 and a pair of feed rollers 13 are positioned at both lateral ends of the sheet feeder 11. Frames 61 and 62 extend upright from a frame 6. A feed roller shaft 13*a* is rotatably mounted on the frames 61 and 62. The feed rollers 13 fit over the feed roller shaft 13*a* so as to be axially slidable but non-rotatable with respect to the feed roller shaft 13*a*. The CSF guides 12 and the feed rollers 13 can be moved toward and away from each other axially of the feed roller shaft 13*a*. Thus, it is possible to accommodate recording papers of various widths.

The cut sheet feeder 11 is tilted at an angle of about 45 degrees. Individual sheets of the recording medium 10 are pulled out by the feed rollers 13, guided to the top surfaces of a pair of guide plates 14, and pulled in between a feed roller 15 located upstream of the printing section 3 and an auxiliary roller 16 in resilient contact with the feed roller 15. Then, each sheet is supplied to the printing section 3. Since the recording medium 10 is thin, slack tends to occur in the middle of the recording medium in the lateral directions. This tends to cause defective feeding results such as wrinkles and oblique feeding. In this example, however, the guide plates 14, guide spring members (described later), and other components prevent slack. The top surfaces of the guide plates 14 have a given height and are shaped into tilted surfaces adapted to be smoothly guided to the printing section 3. The feed roller 15 is firmly mounted to a feed roller shaft 15*a* rotatably held to the frames 61 and 62. The auxiliary roller 16 is rotatably mounted to a pin of an auxiliary roller support 17, which in turn is fixedly mounted to a frame 63.

The second supply path 2 has a width of $W_2$, as shown in FIG. 1. This width $W_2$ is set smaller than and concentric with the first supply path 1. This path 2 is used to supply the rigid recording medium 20 (e.g. a CD, a metal plate, a resinous plate, or the like) that is thicker than the recording medium 10. As shown in FIG. 2, the path 2 is formed by tray guide 21 formed on the top surface of the frame 6 such that the path runs straight into the printing section 3.

Figure 3:
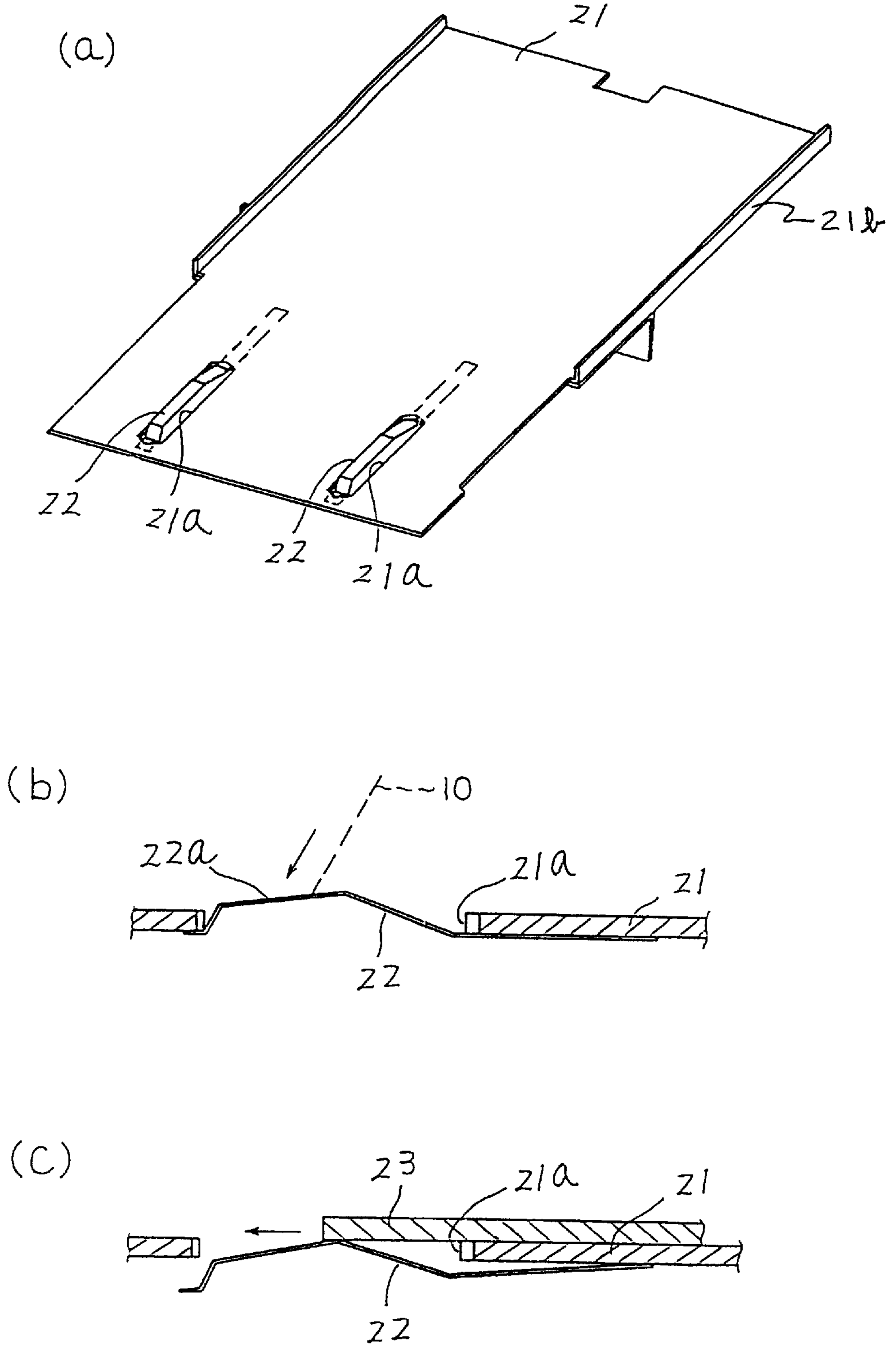
FIG. 3(*a*) is an enlarged perspective view of a tray guide.

As shown in FIGS. 3(*a*), (*b*) and (*c*), the tray guide 21 having side portions 21*b* on the sides is provided with slots 21*a* on both sides of its front-end portion, the slots extending in the direction of motion of the recording medium 20. Each of the guide spring members 22 is made of a slender leaf spring member and has portions that are opposite to the slots 21*a* and bent into a V-shaped form. Guide spring members 22 extend through the slots 21*a*. One end of the leaf spring material is mounted to the rear surface of each tray guide 21. The V-shaped portion is so shaped that its tilted surface 22*a*, located on the side of the V closest to the printing section 3, is substantially identical in height and gradient to the tilted surfaces of the guide plates 14. The guide plates 14 and the guide spring members 22 are substantially aligned in the lateral direction at the intersection of the first supply path 1 and the second supply path 2.

Figure 4:
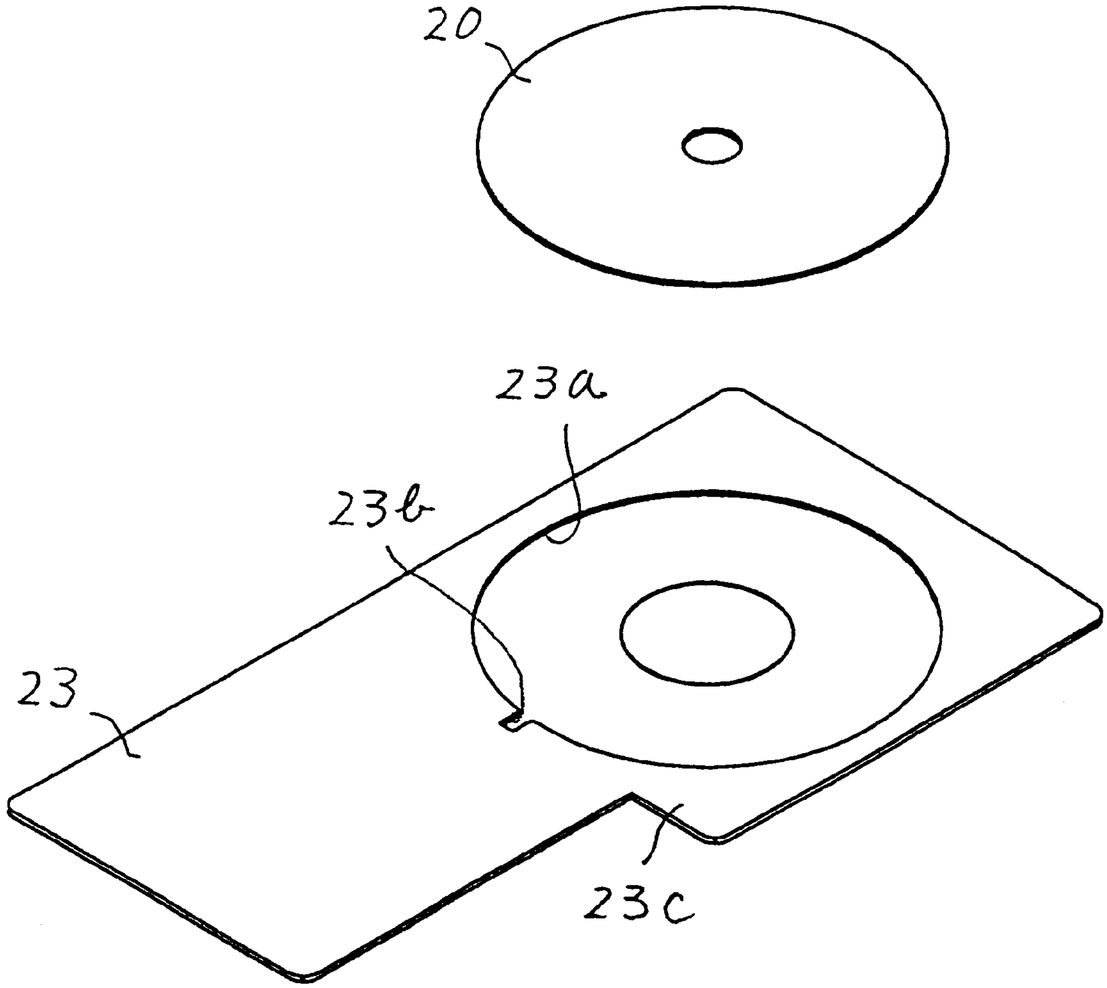
FIG. 4 is a perspective view of a CD and a tray in which the CD is to be inserted.

As mentioned previously, the guide plates 14 and the guide spring members 22 are mounted at a given height for a specific reason. The reason being that the recording media 10 and 20 are different in thickness and so the floor positions required for smoothly feeding each recording medium to the feed roller 15 and to the auxiliary roller 16 slightly differ. In particular, in the case of the thick-walled recording medium 20, the floor surface of the tray guide 21 must be made lower by an amount corresponding to the larger thickness of the medium 20. However, if the thin-walled recording medium 10 is supplied with this low floor surface, it is likely that the medium will not be neatly fed in between the rollers 15 and 16, thus producing incorrect feeding action. Accordingly, where the thin-walled recording medium 10 is sent, it is desired to feed the medium between the rollers 15 and 16 at a given height above the floor surface of the tray guide 21. The given height of the guide plates 14 and guide spring members 22 is set to such a value that the aforementioned requirement is best satisfied.

Where a circular CD that is one example of the recording medium 20 is supplied from the tray guide 21, a recessed portion 23*a* conforming in shape to the profile of the recording medium 20, i.e. a CD, is formed in the top surface of the rear half portion of a rectangular tray 23 made of a metal or resin, as shown in FIG. 4. The CD 20 is placed into the recessed portion 23*a*. The recessed portion 23*a* is provided with an engaging keyway 23*b* to stop rotation of an adapter (described later). The CD 20 is installed in the recessed portion 23*a*. The tray 23 has a front half portion in which one side portion is cut out. Its corner portion forms a sensor portion 23*c*.

The tray 23 set on the tray guide 21 advances while being kept in a planar state as shown in FIG. 3(*c*) and distorts the guide spring members 22 downward. In the same way as in the case of the first supply path 1, the tray is pulled in between the feed roller 15 and the auxiliary roller 16 in resilient contact with the feed roller 15 and supplied to the printing section 3. Since the width between the tray guides 21 and the width of the second supply path 2 is smaller than the width between the guide plates 14, the tray 23 advances while distorting the guide spring members 22 downward as mentioned above without touching the top surfaces of the guide plates 14.

The aforementioned feed rollers 13 and 15 are rotationally driven by rotation of a motor 18, shown in FIG. 1 via the feed roller shaft 13*a* and via the roller shaft 15*a*.

The printing section 3 comprises a platen 31 elongated across the width of the printer and a print head 32 located opposite to the platen and capable of moving. The platen 31 is made stationary by the frames 61 and 62. The print head 32 is carried on a carriage 33, which is guided by a guide shaft 34 whose both ends are supported to the frames 61 and 64. The carriage is reciprocated by operation of an electric motor 19, shown in FIG. 1. When the recording medium 10 or 20 supplied from the first supply path 1 or the second supply path 2 is passing across the gap between the platen 31 of the printing section 3 and the print head 32, the print head 32 ejects ink at given timing commanded by external instructions, thus printing on the top surface of the recording medium 10 or 20.

The discharge portion 4 comprises a discharge roller 41 located downstream of the printing section 3 and an auxiliary roller 42 in resilient contact with the discharge roller 41. The discharge portion discharges the recording medium on which prints have been made by the printing section 3. The discharge roller 41 is pivoted via a discharge roller shaft 41*a*. The auxiliary roller 42 is rotatably coupled to the frame 65. The discharge roller 41 is rotated via the discharge roller shaft 41*a* by operation of the motor 18, shown in FIG. 1.

A device 5 for detecting the position of the recording medium 10 or 20 is next described. As shown in FIGS. 1 and 2, a light-transmitting type sensor 51, for example, is mounted to the frame 63. Since the supply or discharge of the recording medium 10 or 20 is detected by blocking and unblocking the optical path to this sensor 51, a lever 52 is interposed between the top surface of the passing recording medium 10 or 20 and the sensor 51. The lever 52 is swingably supported around its center. The lever has one end (top end) located opposite to the sensor 51 to permit the optical path to be blocked and unblocked. The other end (bottom end) is pushed up by supply of the recording medium 10 or 20, thus swinging the lever 52. Where no recording medium 10 or 20 is present, the bottom end of the lever 52 touches the top ends of the tray guide 21. When the recording medium 10 or 20 passes, the bottom end of the lever 52 is pushed up, swinging the lever. This permits a sensing operation of the sensor 51. Therefore, the machine is set up so that the height of the bottom end of the lever produces a sufficient difference between the case when a recording medium 10 or 20 is present and when no medium is present. The angle through which the lever 52 is swung is set large enough to permit stable detection of the sensor 51. Furthermore, it is necessary that either the recording medium 10 or 20 can pass across the lateral position of the lever 52. When the bottom end of the lever 52 is pushed up, if the recording medium does not slack, the stability of the detection is improved. Preferably, therefore, the bottom end of the lever 52 is close to the guide spring members 22 that support the recording medium 10 or 20 from below or is between each guide plate 14 and each guide spring member 22.

When the front end of the supplied recording medium 10 or 20 is detected by the sensor 51 via the lever 52, the print start position on the recording medium 10 or 20 is set. When the rear end of the recording medium 10 or 20 is detected, the print end position on the recording medium 10 or 20 is set. Also, the timing of discharge of the recording medium 10 or 20 is set.

Figure 5:
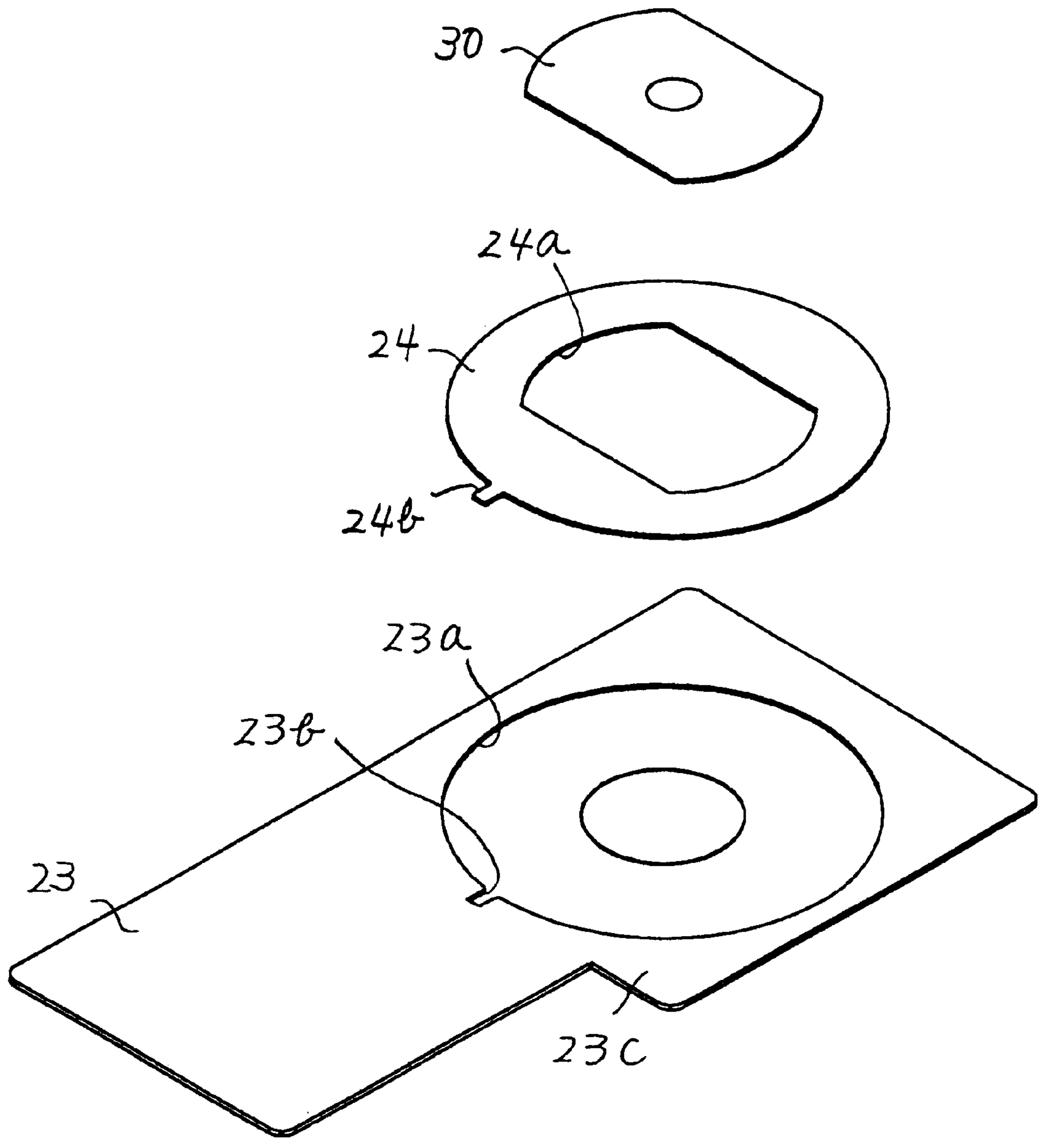
FIG. 5 is a perspective view of a recording medium for use with another example of the invention, an adapter in which the recording medium is to be held and a tray in which this adapter is to be mounted.

FIG. 5 shows an embodiment of the current invention used to make prints on an oval recording medium 30. The tray 23 has already been described in connection with FIG. 4. The recording medium 30 is set in the tray 23 via an adapter 24. As shown in FIG. 5, the adapter 24 is so shaped that it is centrally provided with an opening **24*a* in which the recording medium 30 can be placed. The outside contour of the adapter 24 is circular so as to be capable of fitting into a recessed portion 23*a*. A protrusion 24*b* capable of being engaged in the engaging keyway 23*b* is formed on the outer surface of the adapter. Accordingly, the adapter 24 having the opening 24*a* in which the recording medium 30 has been placed is itself placed into the recessed portion 23*a* in the tray 23. The protrusion 24*b* is placed in the position of the engaging keyway 23*b*, and then the adapter 24 is placed into the recessed portion 23*a*. Thus, the adapter 24 is placed in position circumferentially around the recessed portion 23*a* and locked in a given position on the tray 23. Consequently, the recording medium 30 held in this adapter is maintained in the proper posture for printing. Since the printing operation is performed while maintaining this posture, prints can be made in correct positions on the recording medium 30**.

Figure 6:
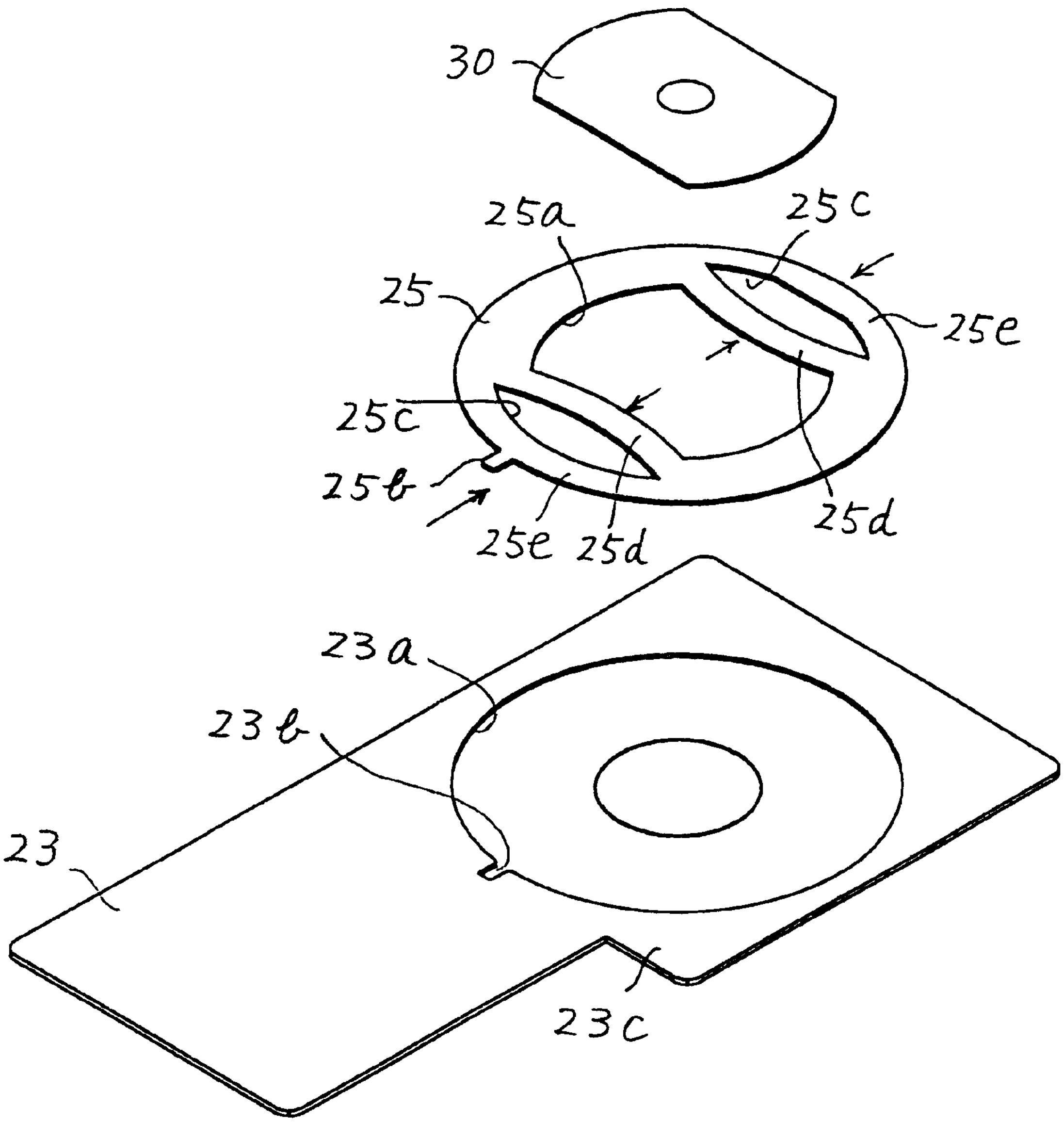
FIG. 6 is a perspective view of a recording medium for use with a further example of the invention, an adapter in which the recording medium is to be held and a tray in which this adapter is to be mounted.

FIG. 6 shows an example using another adapter 25 to hold the oval recording medium 30. The recording medium 30 and tray 23 shown in FIG. 6 are the same as those described in connection with FIG. 5. The shape of the adapter 25 shown in FIG. 6 is now described. This adapter is centrally provided with an opening **25*a* in which the recording medium 30 can be placed. The adapter has a circular outer contour capable of fitting into the recessed portion 23*a*, and a protrusion 25*b* formed on the outer contour, capable of engaging the engaging keyway 23*b* in the same way as in the example of FIG. 5. In this example, substantially semicircular holes 25*c* are formed on the opposite sides of the opening 25*a*. Because of this geometry, opposite slender portions 25*d* and 25*e* are formed around each of the holes 25*c*. These slender portions 25*d* and 25*e* have resilience and can resiliently bend in the direction indicated by the arrow in FIG. 6, i.e. in the direction to contract the holes 25*c*. When the recording medium 30 is placed in the opening 25*a*, the recording medium 30 is firmly held in the adapter 25 by the resilient force of the slender portions 25*d*. When this adapter 25 is placed in the recessed portion 23*a*, the adapter is firmly held in the tray 23 by the resilient force of the slender portions 25*e*. The protrusion 25*b* is placed into the position of the engaging keyway 23*b*, and the adapter 25 is placed into the recessed portion 23*a*, in the same way as in the embodiment of FIG. 5. Accordingly, the recording medium 30 held in this adapter 25 is firmly maintained in the position necessary for printing. Hence, printing can be done in the correct position on the recording medium 30** at all times.

FIGS. **7*a* and 7*b* show an example in which an alternatively designed adapter is used to hold the oval recording medium 30. In particular, a tray 26 having the same outer contour as the foregoing has a recessed portion 26*a* in which an adapter 27 can be placed. Engaging keyways 26*b* are formed in two opposite locations on the inner surface of this recessed portion 26*a*. The engaging keyways 26*b* are so shaped that they pierce the wall defining lower part of the inner contour of the recessed portion 26*a* while the top surface of the tray 26 at the inner contour extends over the keyways 26*b*. The surfaces extending over the top portions of the engaging keyways 26*b* form escape-preventing portions 26*c*. The adapter 27 placed in the recessed portion 26*a* is similar in shape to the adapter shown in FIG. 6. The adapter is centrally provided with an oval opening 27*a* in which the recording medium 30 can be placed. Protrusions 27*b* capable of engaging the engaging keyways 26*b* are formed on the outer contour. Substantially semicircular holes 27*c* are formed on the opposite sides of the opening 27*a*. Because of this geometry, opposite slender portions 27*d* and 27*e* are formed around each of the holes 27*c*. These slender portions 27*d* and 27*e* have resilience, in the same way as in the case of FIG. 6. In this example, thin-walled escape-preventing portions 27*f* protrude from parts of the slender portions 27*d*, respectively, in an opposite relation to each other. Accordingly, when the recording medium 30 is placed in the opening 27*a*, the recording medium 30 is firmly held in the adapter 27 by the resilient force of the slender portions 27*d*. At the same time, the escape preventing portions 27*f* prevent the medium from escaping toward the face. When this adapter 27 is placed in the recessed portion 26*a* of the tray 26, the adapter 27 is firmly held in the tray 26 by the resilient force of the slender portions 27*e*. Simultaneously, the escape-preventing portions 26*c* prevent the recording medium 30 from escaping toward the face. The protrusions 27*b* are placed in the position of the engaging keyway 26*b* and the adapter 27 is placed into the recessed portion 26*a*, in the same way as in the case of FIG. 5. Therefore, the recording medium 30 held in this adapter 27 is firmly maintained in the position necessary for printing. Furthermore, the medium does not escape toward the face. In consequence, printing can be done in the correct position on the recording medium 30** at all times.

Since the machine is constructed in this way, if recording paper of width $W_1$ is supplied as the recording medium 10 from the first supply path 1, wide sheets of recording paper placed in the cut sheet feeder 11 are sent out one by one by the feed rollers 13. The front end of each sheet of the recording paper is guided by the tilted surface of each guide plate 14 and by the tilted surface **22*a* of each guide spring member 22. Thus, each sheet is pulled in between the feed roller 15 and the auxiliary roller 16 while curving gently without slacking laterally or moving obliquely. At this time, the front end of each sheet of the recording paper pushes up the bottom end of the lever 52, swinging it. Therefore, the sensor 51 senses arrival of the sheet. As mentioned previously, each sheet of the recording paper is supported at a given height by the guide plates 14 and by the guide spring members 22 and so the sheet can withstand the upwardly pushing force applied to the bottom end of the lever and does not slacken. Hence, the sensor 51** can accurately perform the sensing operation.

Prints are made on the paper supplied to the printing section 3 by the feed roller 15 and by the auxiliary roller 16 as described above. The paper is discharged by the discharge portion 4. When the rear end of the recording paper passes across the lever 52, the lever returns to its original state from the swung state. The sensor 51 returns to its non-detecting state.

Where narrow recording paper of width $W_2$ is supplied as the recording medium 10 from the first supply path 1, the feed rollers 13 on both sides are brought close to each other in conformity with the width of the recording paper. Individual sheets of the recording paper are sent out one by one. Since the recording paper is narrow, it is not guided by the tilted-surfaces of the guide plates 14. Also, in this case, as shown in FIG. 3(*b*), the paper is guided by the tilted surfaces 22*a* of the guide spring members 22 of the tray guide 21 and, therefore, the paper can stand up to the force that tries to push up the bottom end of the lever 52. The paper does not slack. The sensor 51 can perform an accurate sensing operation. The subsequent operations are the same as those described previously.

Where prints are made on the top surface of the rigid recording medium 20 such as a CD, the second supply path 2 is used. In the case of a CD, the CD 20 is incorporated into the tray 23 shown in FIG. 4, placed on the top surfaces of the tray guide 21, and pushed into the printing section 3. Since the top surface of the CD incorporated in the tray 23 has a sufficient height to swing the lever 52, the tray 23 advances within a plane while distorting the guide spring members 22 downward, as shown in FIG. 3(*c*). The sensor portion 23*c* of the tray pushes up the bottom end of the lever 52, swinging the lever. Therefore, the sensor 51 performs an accurate sensing operation. The subsequent operations are the same as those previously described.

Figure 7:
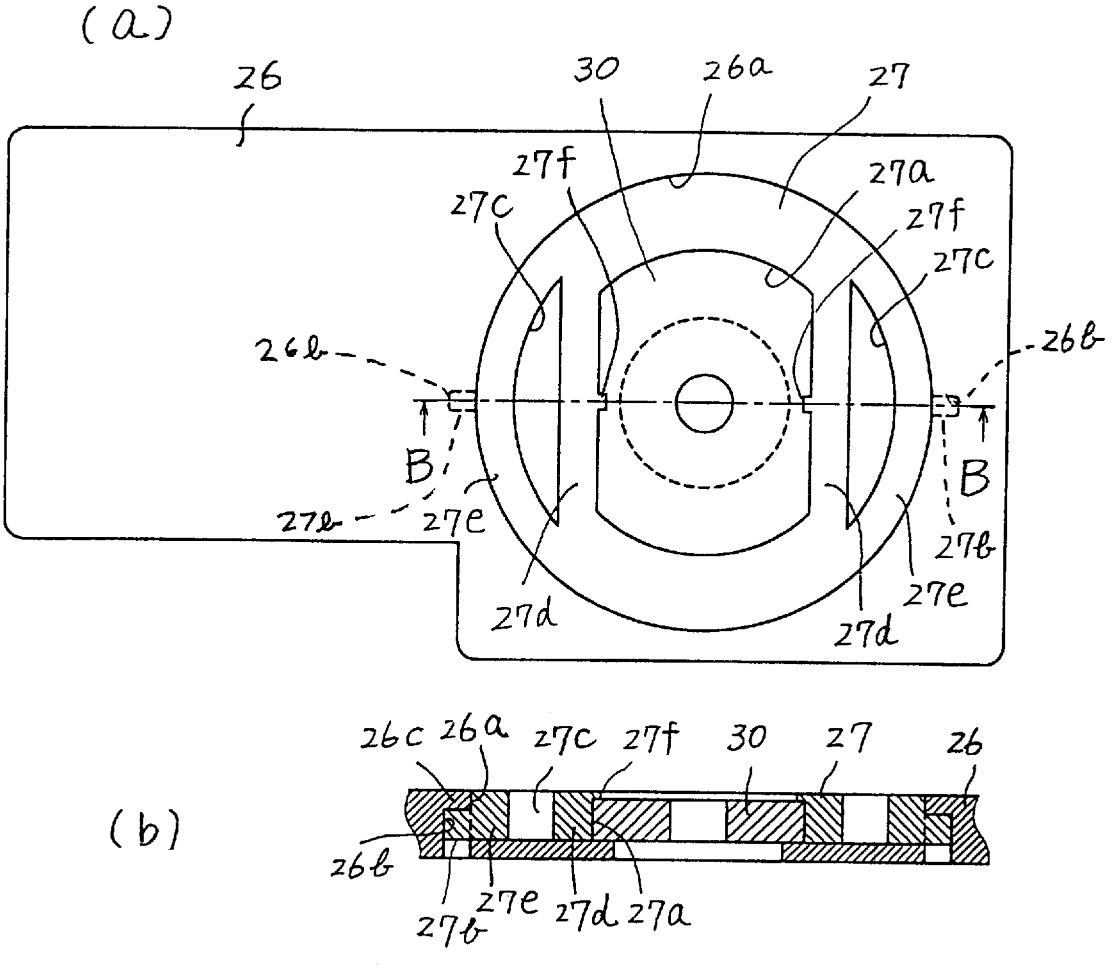
FIG. 7(*a*) is a plan view of a tray in which a recording medium and an adapter are mounted, showing an alternate example of the invention.
Figure 8:
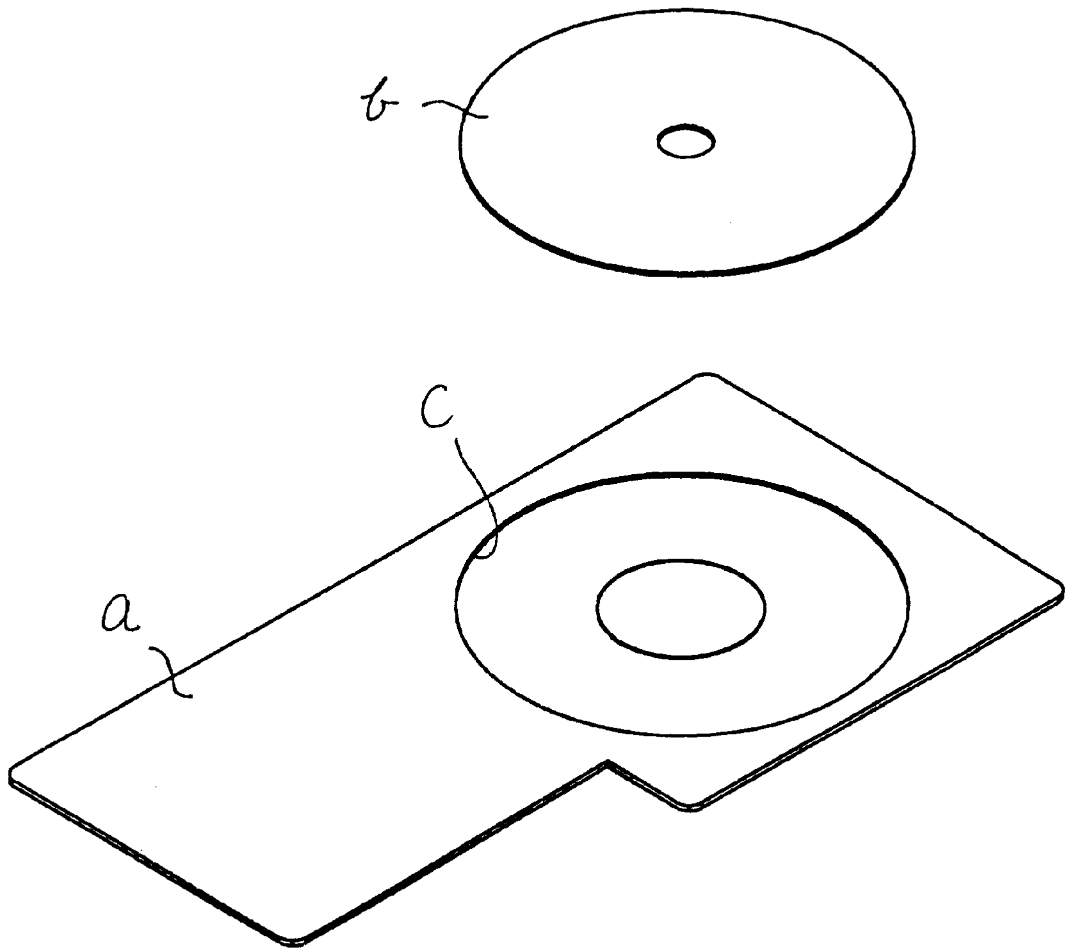
FIG.8 PRIOR ART
FIG. 8 is a perspective view of a CD and a tray in which this CD is mounted, showing the prior art structure.

When prints are made on the top surface of the oval recording medium 30, the second supply path 2 is also used. In this case, the recording medium 30 is placed into the opening 24*a* or 25*a* in the adapter 24 or 25 shown in FIG. 5 or 6, respectively, and then the medium is mounted into the recessed portion 23*a* in the tray 23. After the tray 23 is placed on the top surface of the tray guide 21 and pressed toward the printing section 3, the same operations are performed as the operations described above. In the example shown in FIG. 5, the adapter 24 does not move out of position circumferentially around the recessed portion 23*a*. Therefore, prints are made in correct positions on the recording medium 30. Furthermore, in the example shown in FIG. 6, the adapter 25 is additionally held in position by the resilient force of the slender portions 25*d* and 25*e*. Further, the recording medium 30 is held in position by the resilience of slender portions 25*d*. Hence, prints are made in correct positions on the recording medium 30 with improved stability.

Where prints are made on the top surface of the oval recording medium 30 by the example of FIG. 7, the second supply path 2 is also used. In this case, the recording medium 30 is placed into the opening 27*a* in the adapter 27 to prevent it from escaping toward the face of the recording medium 30. Then, the medium is placed into the recessed portion 26*a* in the tray 26. The adapter 27 is held to the tray 26 such that it cannot escape toward the face of the recording medium 30. This tray 26 is placed on the top surface of the tray guide 21 and prints are made on the top surface of the recording medium 30 in the same way as the process described above. In this example, neither the adapter 27 nor the recording medium 30 shifts out of position circumferentially around the recessed portion 26*a*. Furthermore, they do not escape toward the face of the recording medium 30. In consequence, prints are made in correct positions on the recording medium 30 at all times.

As described thus far, in the printer in accordance with the present invention, a tray in which an adapter can be removably mounted is used, the adapter permitting a recording medium to be firmly held therein. Therefore, if adapters adapted to firmly hold recording media of different shapes are prepared, the printer can adapt itself to recording media of various shapes by a simple and economical structure using a common tray and a replaceable adapter.

An engaging groove or keyway is formed in one of the adapter and the tray. A protrusion engaging this engaging groove or keyway is formed on the other. The adapter is mounted in the tray while held in position. An opening is formed in the adapter. The adapter is resiliently mounted in the tray to prevent rattle. The recording medium is mounted to the adapter without shaking. If escape-preventing portions are formed on the adapter and on the tray to prevent the recording medium and the adapter from escaping toward the face of the recording medium, prints can be made in accurate positions on the recording medium. Hence, good print quality can be obtained.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A printer comprising:

a tray, a supply path for supplying a recording medium, a printing section for printing on said recording medium supplied to said printing section from said supply path, a discharge portion for discharging the recording medium from said printing section, said recording medium being supplied to said printing section from said supply path while held by said tray; and an adapter capable of firmly holding said recording medium therein and being detachably mounted in said tray, wherein said adapter has at least one resilient portion for securing said recording medium in said adapter.

2. The printer of claim 1, wherein one of said adapter and said tray has an engaging keyway while the other has a protrusion that engages said engaging keyway to place and maintain said adapter in said tray.

3. The printer of claim 1, wherein said adapter is provided with an opening in which said recording medium can be placed and holes on opposite sides of said opening leaving slender portions facing said recording medium which resiliently deform so as to shrink the holes when said recording medium is placed therein, thus resiliently holding said recording medium in said adapter.

4. The printer of claim 1, wherein said adapter is provided with an opening in which said recording medium can be placed and has a contour capable of fitting into a recessed portion formed in said tray.

5. The printer of claim 1, wherein said adapter is provided with a stop portion for preventing said recording medium from escaping toward its face.

6. The printer of claim 1, wherein said tray is provided with a stop portion for preventing said adapter from escaping toward a face of said recording medium.

7. A tray for supplying a recording medium to a printing section of a printer, said tray comprising a recessed portion; said recessed portion having one of an engaging keyway and a protrusion, and an adapter for holding said recording medium, said adapter received in said recessed portion, wherein said adapter has at least one resilient portion for securing said recording medium in said adapter.

8. The tray of claim 7, wherein said adapter has the other of an engaging keyway and a protrusion.

9. The tray of claim 7, wherein said adapter has a stop portion preventing said recording medium from escaping toward its face.

10. The tray of claim 7, wherein said tray has a stop portion preventing said adapter from escaping toward its face.

11. The tray of claim 7, wherein said adapter is one of a plurality of adaptors, each having an opening of a different shape to accommodate recording medium of different shape.

12. The tray of claim 7, wherein said adapter is one of a plurality of adapters, each having an opening of a different size to accommodate recording media of different sizes.

13. An adapter for holding a recording medium in a tray for supplying the recording medium to a printing section of a printer comprising, an opening for receiving said recording medium, said adapter having an outer contour that fits within a recess in said tray, and at least one resilient portion for securing said recording medium.

14. The adapter of claim 13, further comprising one of an engaging keyway and a protrusion.

15. A printer comprising:

a tray having a recessed portion;

a supply path supplying a recording medium for printing thereon, said recording medium being held by said tray; and an adapter detachably mounted within said recessed portion of said tray and configured to hold said recording medium therein, wherein said adapter is configured to expose a surface of said recording medium for printing thereon, wherein one of said adapter and said tray has an engaging keyway while the other has a protrusion that engages said engaging keyway to prevent rotational movements of said adapter relative to said tray and wherein one of said engaging keyway and said protrusion extends from said recessed portion.

* * * * *

UNITED STATES PATENT AND TRADEMARK OFFICE
CERTIFICATE OF CORRECTION

PATENT NO. : 6,612,762 B1
DATED : September 2, 2003
INVENTOR(S) : Motoharu Sakurai et al.

It is certified that error appears in the above-identified patent and that said Letters Patent is hereby corrected as shown below:

Title page,
Item [*] Notice, should read:
-- Notice: Subject to any disclaimer, the term of this patent is extended or adjusted under 35 U.S.C. 154 (b) by 66 days. --

Signed and Sealed this

Twenty-third Day of December, 2003

JAMES E. ROGAN
*Director of the United States Patent and Trademark Office*